(12) United States Patent
Saigo et al.

(10) Patent No.: US 8,992,201 B2
(45) Date of Patent: Mar. 31, 2015

(54) APPARATUS FOR COOLING STATOR

(75) Inventors: Takeshi Saigo, Nagoya (JP); Kenji Harada, Miyoshi (JP); Masaru Hirako, Miyoshi (JP); Hideaki Yasuda, Chita-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 449 days.

(21) Appl. No.: 13/522,284

(22) PCT Filed: Jan. 14, 2010

(86) PCT No.: PCT/JP2010/050311
§ 371 (c)(1),
(2), (4) Date: Jul. 31, 2012

(87) PCT Pub. No.: WO2011/086676
PCT Pub. Date: Jul. 21, 2011

(65) Prior Publication Data
US 2012/0294962 A1    Nov. 22, 2012

(51) Int. Cl.
*B29C 35/16* (2006.01)
*H02K 15/12* (2006.01)

(52) U.S. Cl.
CPC ....................... *H02K 15/12* (2013.01)
USPC ........... 425/135; 425/140; 425/143; 264/237; 264/348

(58) Field of Classification Search
USPC .................. 425/135, 140, 143; 264/237, 348
See application file for complete search history.

(56) References Cited

FOREIGN PATENT DOCUMENTS

| JP | 61-62775 A | 3/1986 |
|---|---|---|
| JP | 03-120312 A | 5/1991 |
| JP | 05-177240 A | 7/1993 |
| JP | 2003-79113 A | 3/2003 |
| JP | 2006-046974 A | 2/2006 |

OTHER PUBLICATIONS

International Search Report of PCT/JP2010/050311 mailed Mar. 23, 2010.

*Primary Examiner* — James Sanders
(74) *Attorney, Agent, or Firm* — Kenyon & Kenyon LLP

(57) ABSTRACT

A cooling equipment to be used to cool a stator after molding includes first to third cooling stations, and a detecting station provided in front of the first cooling station. Each of the cooling stations includes a plurality of nozzles that spray dry mist to the stator, a plurality of fans that blow air to the stator, a temperature sensor that detects the temperature of the stator, and first to third control units. Furthermore, the detecting station includes a distance sensor that detects the size of the stator, and an integration control unit. The integration control unit identifies the type of the stator based on the detected size, and informs each control unit of the results. Each control unit controls the quantity of water to be supplied to each nozzle and the quantity of air to be blown by each fan based on the identified type and the detected temperature.

7 Claims, 11 Drawing Sheets

1: 1ST COOLING STATION
2: 2ND COOLING STATION
3: 3RD COOLING STATION

FIG. 11

| ○○ kg ± 0.1kg ⇌ Type A ⇌ Cooling Program A1 |
| □□ kg ± 0.1kg ⇌ Type B ⇌ Cooling Program B1 |
| △△ kg ± 0.1kg ⇌ Type C ⇌ Cooling Program C1 |
| ×× kg ± 0.1kg ⇌ Type D ⇌ Cooling Program D1 |

FIG. 13

| | | | |
|---|---|---|---|
| ○○ °C ± 0.1°C ⇒ Type A ⇒ Cooling Program A1 | □□ °C ± 0.1°C ⇒ Type B ⇒ Cooling Program B1 | △△ °C ± 0.1°C ⇒ Type C ⇒ Cooling Program C1 | XX°C ± 0.1°C ⇒ Type D ⇒ Cooling Program D1 |

APPARATUS FOR COOLING STATOR

CROSS-REFERENCE TO RELATED APPLICATIONS

This is a 371 national phase application of PCT/JP2010/050311 filed on 14 Jan. 2010, the entire contents of which are incorporated herein by reference.

TECHNICAL FIELD

The present invention relates to a stator to be used in a motor and more particularly to a stator cooling apparatus used to cool a stator after molded in a manufacturing process.

BACKGROUND ART

As this type of technique, there is conventionally known a cooling apparatus disclosed for example in Patent Document 1 listed below. This cooling apparatus includes an air supply system, a water supply system, a sprayer, and others. The sprayer is configured to mix water and compressed air and spray the water and air in a mist form to a workpiece. The heat of the workpiece is removed by a quantity of heat including latent heat generated when the mist impinges on an upper surface of the workpiece and then evaporates. The workpiece is cooled in this manner. At that time, the flow amount of water to be supplied to the sprayer is controlled so that the temperature to be detected by a temperature detecting device becomes a target temperature.

RELATED ART DOCUMENTS

Patent Documents

Patent Document 1: JP-A-2006-046974
Patent Document 2: JP-A-5(1993)-177240

DISCLOSURE OF THE INVENTION

Problems to be Solved by the Invention

Meanwhile, in the cooling apparatus disclosed in Patent Document 1, it is conceivable that some workpieces of different types reach the temperature at which sprayed mist could not fully evaporate according to differences in size and shape. Accordingly, there is a concern that dew condensation occurs on the surfaces of workpieces and thereby such surfaces are rusted.

The present invention has been made in view of the circumstances and has a purpose to provide a stator cooling apparatus capable of cooling a stator by completely evaporating mist sprayed onto the stator, irrespective of difference in stator type.

Means of Solving the Problems (1) To achieve the above purpose, a first aspect of the invention provides a stator cooling apparatus to be used to cool a stator after molded, the apparatus including: a spraying device for spraying water in the form of fine particles to the stator; an air-blowing device for blowing air to the stator; a type identifying device for identifying a type of the stator; a temperature detecting device for detecting a temperature of the stator; and a control device for controlling an amount of water to be supplied to the spraying device and an amount of air to be supplied by the air-blowing device based on the identified type and the detected temperature.

According to the configuration (1), fine particulate water is sprayed onto the stator by the spraying device and air is blown by the air-blowing device to the stator to cool the stator. At that time, the stator is cooled by the heat of evaporation generated when the fine water particles evaporate around the stator. Herein, the type of the stator is identified by the type identifying device and the temperature of the stator is detected by the temperature detecting device. Based on the identified type and the detected temperature, the amount of water to be supplied to the spraying device and the amount of air to be supplied by the air-blowing device are controlled to respective suitable amounts by the control device. Accordingly, a suitable amount of water required for cooling is sprayed onto the stator according to the identified type of the stator and the temperature state of the stator at that time.

(2) To achieve the above purpose, in the configuration (1), preferably, the type identifying device includes a distance sensor for detecting a distance from the stator and a type determining device for determining the type of the stator based on the detected distance.

According to the configuration (2), in addition to the operations of the configuration (1), the type of the stator is determined by the type determining device based on the distance from the stator detected by the distance sensor, so that the type determination is conducted in a noncontact manner. To be more specific, the size of the stator is found from the detected distance and thus the type of the stator is determined from the size.

(3) To achieve the above purpose, in the configuration (1), preferably, the type identifying device includes a weight sensor for detecting a weight of the stator and a type determining device for determining the type of the stator based on the detected weight.

According to the configuration (3), in addition to the configuration (1), the type of the stator is determined by the type determining device based on the weight of the stator detected by the weight sensor, so that the type determination can be performed by directly reflecting the heat capacity of the stator.

(4) To achieve the above purpose, in the configuration (1), preferably, the type identifying device includes a type determining device arranged to calculate a lowering temperature of the stator in a first cooling process based on the temperature detected by the temperature detecting device and determine the type of the stator based on the calculated lowering temperature.

According to the configuration (4), in addition to the configuration (1), the type of the stator is determined by the type determining device from the lowering temperature of the stator calculated based on the temperature detected by the temperature detecting device. Therefore, any other sensor than the temperature detecting device is not necessary.

(5) To achieve the above purpose, in one of the above configurations (1) to (4), preferably, the temperature detecting device is provided to be able to contact with the stator by a stopper for restricting movement of the stator.

According to the configuration (5), in addition to the operations of one of the configurations (1) to (4), the temperature detecting device contacts with the stator when the movement of the stator is restricted by the stopper. Therefore, no special mechanism for making the temperature detecting device contact with the stator is needed.

Effects of the Invention

According to the above configuration (1), it is possible to completely evaporate mist sprayed and supplied to the stator to appropriately cool the stator, irrespective of the difference in type of the stator.

According to the above configuration (2), in addition to the effects of the configuration (1), the type determination of stator is conducted in a noncontact manner, so that the stator can be prevented from possible damage due to contact with the type identifying device.

According to the above configuration (3), in addition to the effects of the configuration (1), the type determination is performed by directly reflecting the heat capacity of the stator. This can increase the precision of the stator type determination.

According to the above configuration (4), in addition to the effects of the configuration (1), because of no need of any other devices than the temperature detecting device, the configuration of the cooling apparatus can be simplified.

According to the above configuration (5), in addition to the effects of one of the configurations (1) to (4), because of no need of any special mechanism to make the temperature detecting device contact with the stator, the configuration of the cooling apparatus can be simplified.

BRIEF DESCRIPTION OF THE DRAWINGS

FIG. 11 is a table showing processing contents of an integration control unit in the second embodiment;

FIG. 13 is a table showing processing contents of an integration control unit in the third embodiment.

MODE FOR CARRYING OUT THE INVENTION

First Embodiment

A detailed description of a first embodiment of a stator cooling apparatus embodying the present invention will now be given referring to the accompanying drawings. This embodiment embodies the present invention in the form of cooling equipment to be used in a stator manufacturing process.

Figure 1:
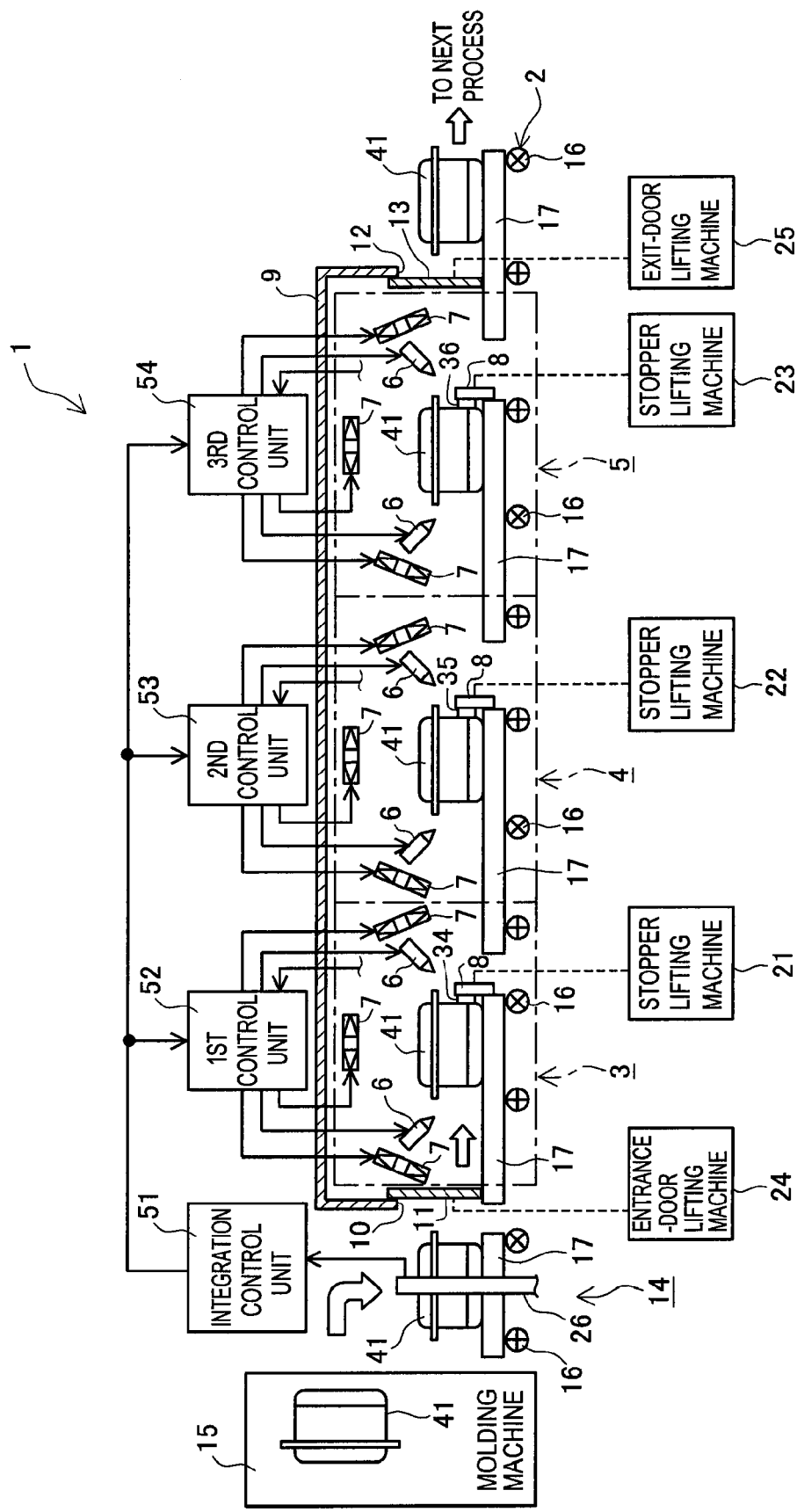
FIG. 1 is a schematic configuration view showing cooling equipment in a first embodiment.

FIG. 1 is a schematic configuration view of cooling equipment 1 in the present embodiment. This cooling equipment 1 includes a conveyer 2, a plurality (three in this embodiment) of first to third cooling stations 3, 4, and 5 arranged along the conveyer 2, a plurality of nozzles 6 and a plurality of fans 7 provided in each of the cooling stations 3 to 5, stoppers 8 provided in each of the cooling stations 3 to 5, a horizontally oriented cover 9 placed to cover all the cooling stations 3 to 5, an entrance door 11 provided in an entrance 10 of the cover 9, an exit door 13 provided in exit 12 of the cover 9, and a detecting station 14 provided in front of the entrance 10 of the cover 9.

The conveyer 2 is to convey a stator 41 as a workpiece after resin-molded-molding molding by a predetermined molding machine 15 in a manufacturing process of the stator 41. The conveyer 2 is constituted of a roller conveyer including a plurality of drive rollers 16. Each drive roller 16 is rotated in the same direction by a drive source (not shown). The stator 41 after resin-molded is put as a workpiece on a carriage 17 and conveyed together with the carriage 17 by the conveyer 2.

Figure 2:
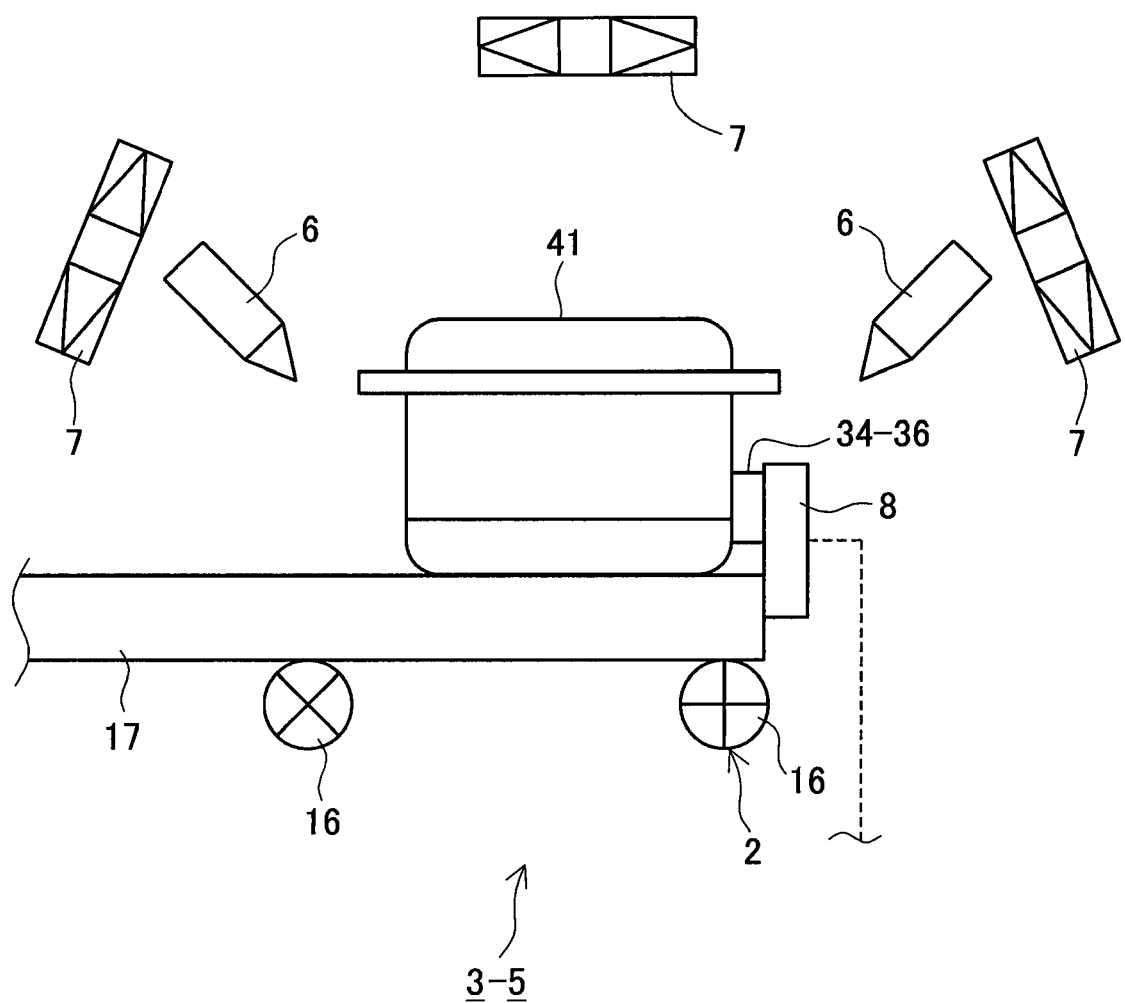
FIG. 2 is a schematic configuration view showing each cooling station in the first embodiment.

FIG. 2 is a schematic configuration view showing the cooling stations 3 to 5. The nozzles 6 are configured to spray water in the form of fine particles onto the stator 41 and correspond to one example of a spraying device of the present invention. In the present embodiment, the nozzles 6 are twin-fluid nozzles configured to make two fluids, i.e., water and air to be supplied, collide with each other to thereby make water into fine particles. Mist supplied from these nozzles 6 is called dry mist. The dry mist is generally formed of mist having a particle diameter of 10 μm or less as a guide for a state where water droplets will not stick to a glass surface apart by about 1 meter from a nozzle 6. Each nozzle 6 is configured to regulate an amount of water to be supplied by opening and closing a diaphragm by an actuator.

As shown in FIG. 2, the fans 7 correspond to one example of an air-blowing device of the present invention. Some of the fans 7 are placed behind the nozzles 6 and other fans 7 are placed at the centers of upper sides in the cooling stations 3 to 5. Each fan 7 is motor-driven to blow air toward the relevant stator 41. This air blow generates a flow of the dry mist from the nozzle 6 to the stator 41.

As shown in FIGS. 1 and 2, each stopper 8 is placed adjacent to the conveyer 2 and arranged to be movable up and down by stopper lifting machines 21, 22, and 23. While each stopper 8 is in a position protruding upward from the conveyer 2 as shown in FIG. 1, the carriages 17 carrying thereon the stators 41 are engaged with the corresponding stoppers 8 and held against movement. On the other hand, while each stopper 8 is retracted downward from the conveyer 2, the carriages 17 carrying thereon the stators 41 are allowed to move. Operations of the stopper lifting machines 21 to 23 are controlled by an integration control unit 51 mentioned later.

As shown in FIG. 1, the entrance door 11 provided in the entrance 10 of the cover 9 is moved up and down by an entrance-door lifting machine 24 to open and close the entrance 10. Similarly, the exit door 13 provided in the exit 12 of the cover 9 is moved up and down by an exit-door lifting machine 25 to open and close the exit 12. Operations of those entrance-door lifting machine 24 and the exit-door lifting machine 25 are controlled by the integration control unit 51 mentioned later.

Figure 3:
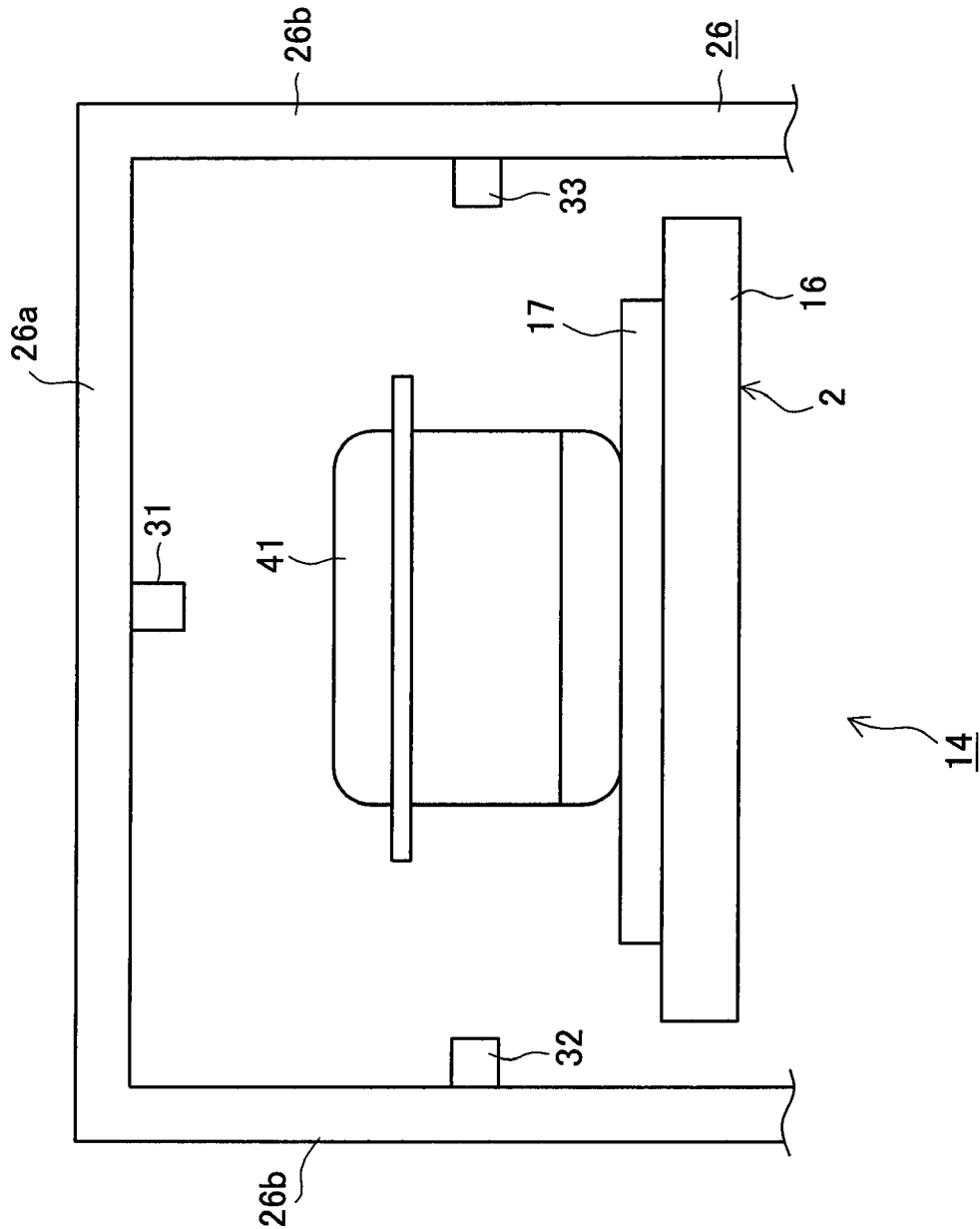
FIG. 3 is a schematic configuration view showing a detecting station in the first embodiment.
Figure 4:
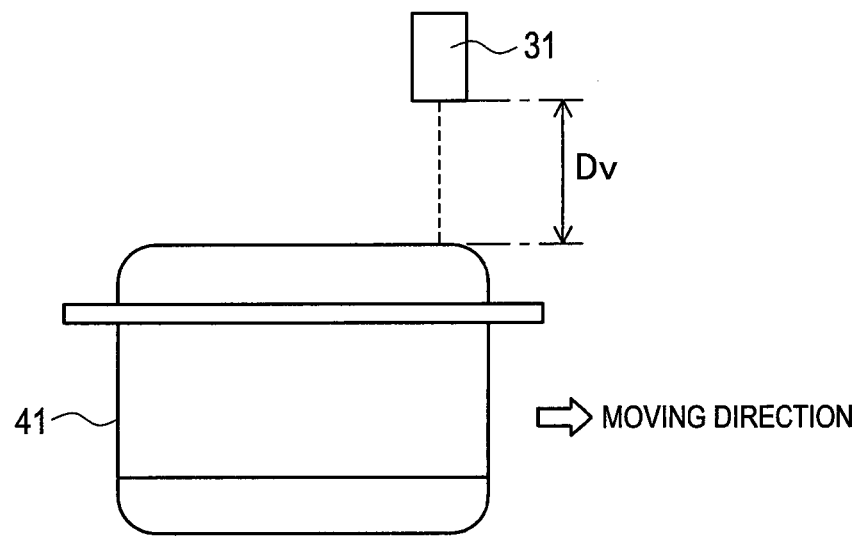
FIG. 4 is a side view showing a relationship between a first distance sensor and a stator in the first embodiment.
Figure 5:
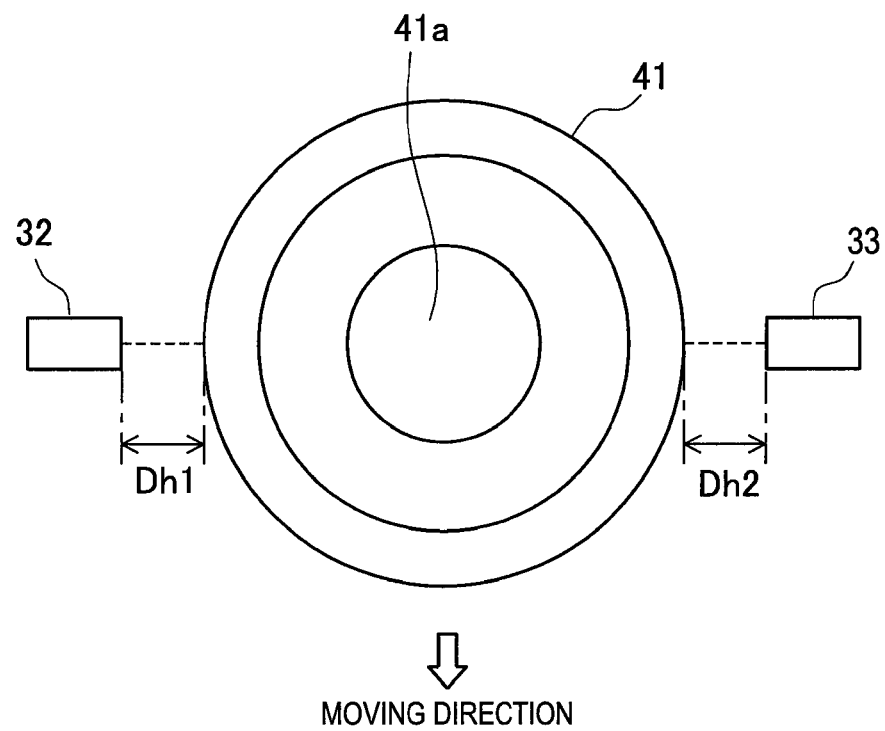
FIG. 5 is a plan view showing a relationship between second and third distance sensors and the stator in the first embodiment.

FIG. 3 is a schematic configuration view showing the detecting station 14. This detecting station 14 is provided with a gate frame 26 above the conveyer 2. An upper side part 26a and vertical side parts 26b of the gate frame 26 are provided with first to third distance sensors 31, 32, and 33 respectively to detect the distances from the stator 41. FIG. 4 is a side view showing a relationship between the first distance sensor 31 and the stator 41. FIG. 5 is a plan view showing a relationship between the second and third distance sensors 32 and 33 and the stator 41. The first distance sensor 31 placed in the upper side part 26a is to detect a vertical distance Dv from the stator 41 when passing through the gate frame 26 during conveyance by the conveyer 2. The second distance sensor 32 and the third distance sensor 33 placed individually on the vertical side parts 26b are to detect horizontal distances Dh1 and Dh2 respectively from the stator 41 when passing through the gate frame 26 during conveyance by the conveyer 2. With those distance sensors 31 to 33, the size of the stator 41 as a workpiece is indirectly detected in a noncontact manner. Each of the distance sensors 31 to 33 may include a light sensor, a laser sensor, an ultrasonic sensor, and others.

Figure 6:
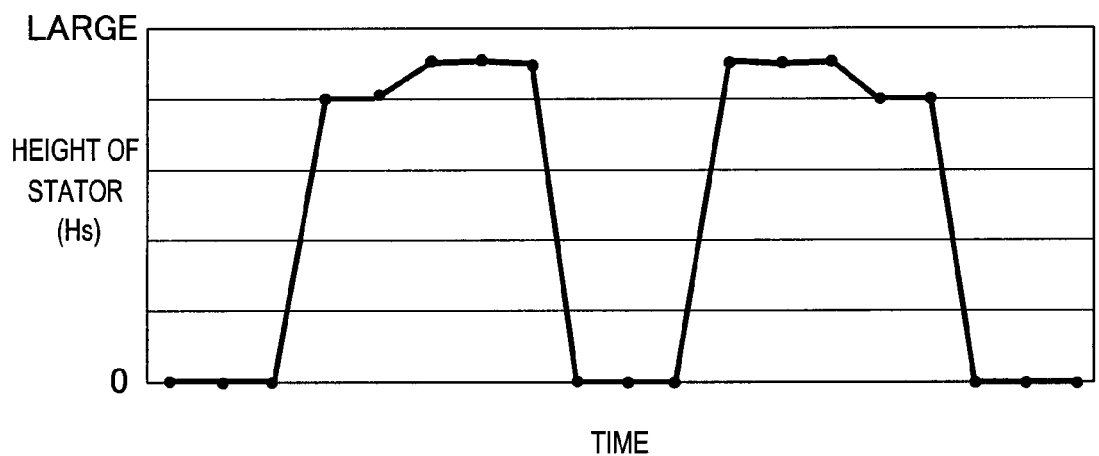
FIG. 6 is a graph showing changes in stator height calculated by a vertical distance detected by the first distance sensor in the first embodiment.
Figure 7:
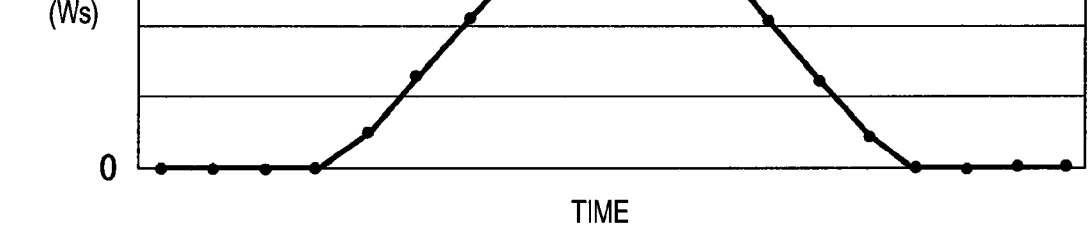
FIG. 7 is a graph showing changes in stator outer diameter calculated by a horizontal distance detected by the second and third distance sensors in the first embodiment.

FIG. 6 is a graph showing changes in stator height Hs calculated from the vertical distance Dv detected by the first distance sensor 31. FIG. 7 is a graph showing changes in stator width Ws calculated from the horizontal distances Dh1 and Dh2 detected respectively by the second distance sensor 32 and the third distance sensor 33. In FIG. 6, two peaks represent maximum height of the stator 41 and a center drop portion represents a hollow part 41a at the center of the stator 41 shown in FIG. 5. In FIG. 7, a center peak represents a stator outer diameter Ds. Based on the stator height Hs and stator outer diameter Ds, the size of the stator 41 can be specified.

In the present embodiment, as shown in FIG. 1, the stators 41 resin-molded by the molding machine 15 are individually brought first to the detecting station 14 in which information of the type (type information) is detected. Specifically, in the detecting station 14, the vertical distance Dv and the horizontal distances Dh1 and Dh2 from each stator 41 are detected by the first to third distance sensors 31 to 33 in order to obtain the stator height Hs and the stator outer diameter Ds. Thereafter, the stator 41 of which the type information is detected is transferred together with the carriage 17 into the cover 9 through the entrance 10. The stator 41 is then stopped by each stopper 8 in the first to third cooling stations 3 to 5 in the process of being conveyed through the cover 9 by the conveyer 2, and cooled with dry mist supplied by the nozzles 6 and the fans 7. In other words, the stator 41 is cooled by use of heat of evaporation generated when the dry mist evaporates. In each of the cooling stations 3 to 5, the stoppers 8 are moved up by the stopper lifting machines 21 to 23 respectively to stop the stator 41 together with the carriage 17. The stator 41 stopped and cooled in sequence in the first to third cooling stations 3 to 5 is finally brought together with the carriage 17 out of the cover 9 through the exit 12, and then to be transferred to a next process.

Herein, to avoid water vapor of the dry mist evaporated in each cooling station 3 to 5 from filling the inside of the cover 9, the cover 9 is provided with an exhaust air duct (not shown) to discharge the water vapor to the outside.

In the present embodiment, the single cooling equipment 1 can be used to appropriately cool various types of stators 41. For this purpose, the generation of dry mist in each cooling station 3 to 5 can be controlled according to the difference in type of the stators 41. In the present embodiment, as shown in FIG. 1, the integration control unit 51 is provided in correspondence with the detecting station 14 and the first to third control units 52, 53, and 54 are provided respectively for the cooling stations 3 to 5. The integration control unit 51 is electrically connected to the first to third control units 52 to 54. To the first to third control units 52 to 53, the nozzles 6 and the fans 7 in each of the cooling stations 3 to 5 are electrically connected. The integration control unit 51 and the first to third control units 52 to 54 are configured to include a central processing unit (CPU), a memory, and others. The integration control unit 51 is arranged to integrally control the cooling operation in each cooling station 3 to 5. The first to third control units 52 to 54 are programmed to control each nozzle 6 and each fan 7 in the corresponding cooling stations 3 to 5.

Specifically, the first to third control units 52 to 54 are configured to control the amount of water to be supplied to each nozzle 6 in order to regulate the generation amount of dry mist in the cooling stations 3 to 5. The first to third control units 52 to 54 are also configured to control the amount of air to be supplied by each fan 7. In addition, the stoppers 8 placed in the cooling stations 3 to 5 are provided respectively with first to third temperature sensors 34, 35, and 36 which are one example of a temperature detecting device of the present invention. Those temperature sensors 34 to 36 are provided to be able to contact with the stators 41 stopped by the stoppers 38. The temperature sensors 34 to 36 are electrically connected to the corresponding control units 52 to 54 and transmit detected temperature data to those control units 52 to 54.

Figure 8:
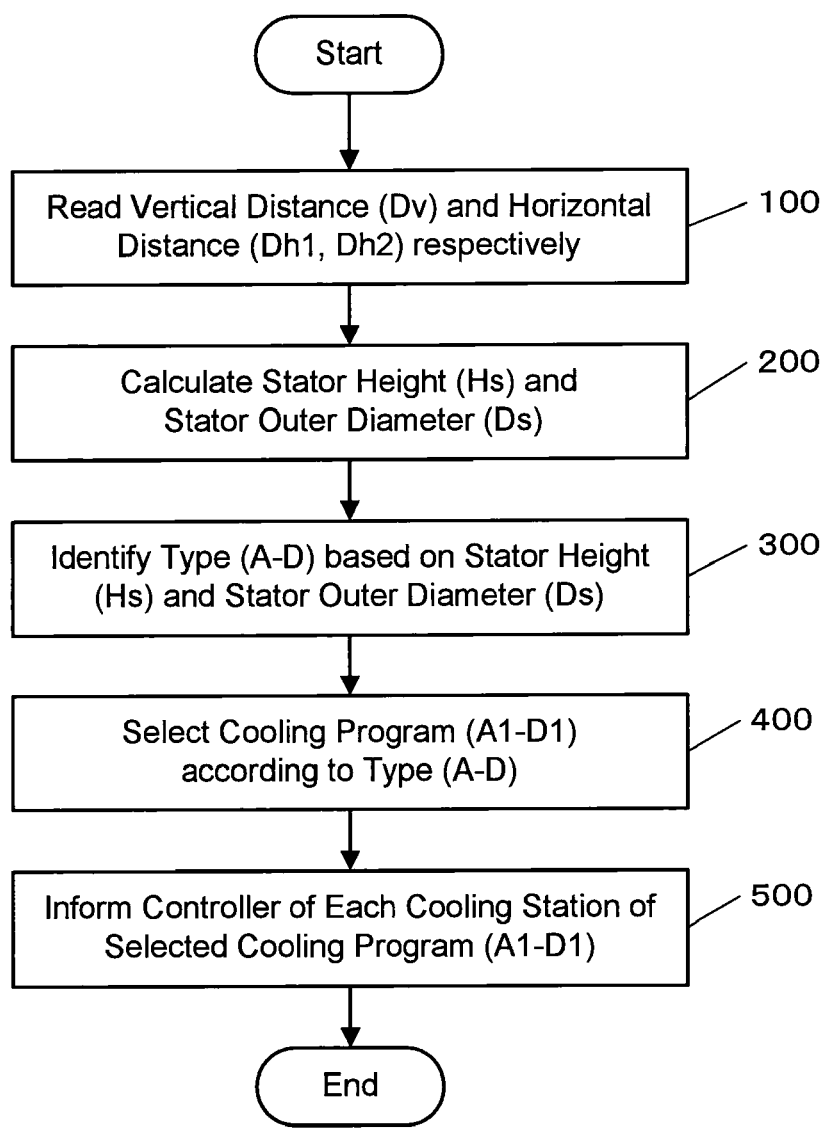
FIG. 8 is a flowchart showing control contents of an integration control unit in the first embodiment.

The control contents to be executed by the integration control unit 51 will be explained below. FIG. 8 is a flowchart showing the control contents.

When the processing shifts to this routine, in step 100, the integration control unit 51 first reads the vertical distance Dv and the horizontal distances Dh1 and Dh2 detected by the distance sensors 31 to 33.

In step 200, the integration control unit 51 then calculates the stator height Hs and the stator outer diameter Ds respectively based on the read vertical distance Dv and the horizontal distances Dh1 and Dh2 (see FIGS. 6 and 7). In this step 200, specifically, the size of the stator 41 as a workpiece is identified. This size is the data reflecting the volume and the heat capacity of the stator 41.

In step 300, successively, the integration control unit 51 determines the type of the stator 41 based on the calculated stator height Hs and stator outer diameter Ds. For instance, it is determined what type the stator 41 is, type A, type B, type C, or type D, which are different in size. The integration control unit 51 for determining the type A-D of the stator 41 as above corresponds to one example of the type determining device of the invention. Further, the distance sensors 31 to 33 and the integration control unit 51 constitute one example of the type identifying device of the invention.

Figure 9:
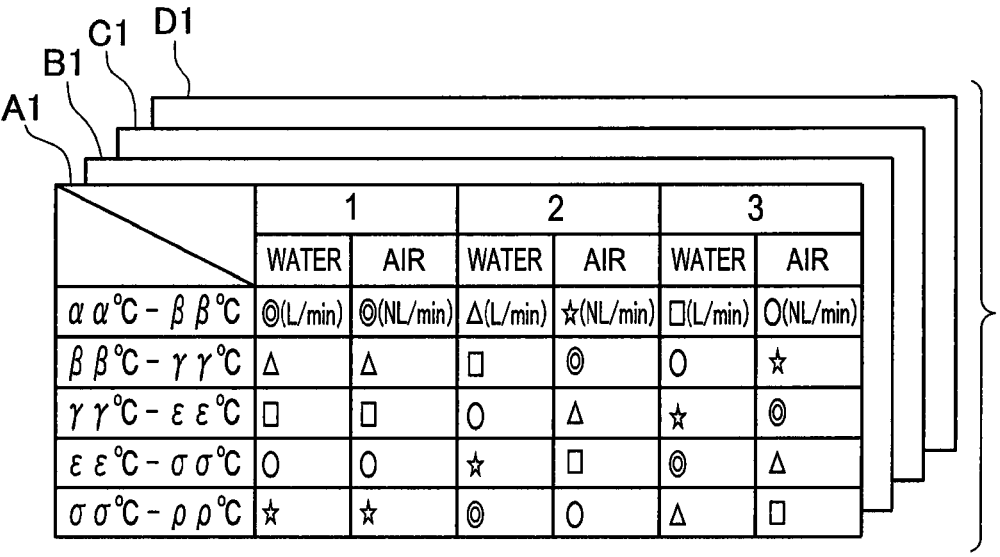
FIG. 9 is a conceptual diagram showing a cooling program map in the first embodiment.

In step 400, subsequently, the integration control unit 51 selects a cooling program according to the determined type A-D. For instance, a cooling program A1, B1, C1, or D1 is selected according to the type A-D from a cooling program map Mcp conceptually shown in FIG. 9. Specifically, the cooling program A1-D1 is selected according to the size of the stator 41. In FIG. 9, the cooling programs A1 to D1 are experimentally determined in advance as best relationships between the amount of water supplied to each nozzle 6 and the amount of air supplied by each fan 7 in the first to third cooling stations 3 to 5 in correspondence with the temperature state of the stator 41 (a temperature range divided in multiple stages). According to those cooling programs A1 to D1, it is possible to cool the stator 41 of any type A-D under a best condition that does not cause condensation of dry mist. The cooling programs A1 to D1 are designed to be different from each other in value of water amount and in value of air amount according to different types A-D of the stators 41. In FIG. 9, the signs "αα, ββ, γγ, εε, σσ, ρρ" represent predetermined values related to temperature and double-circular marks, triangular marks, rectangular marks, circular marks, and star-like marks indicate predetermined values related to the water amount and the air amount.

Thereafter, in step 500, the integration control unit 51 informs the selected cooling program A1, B1, C1, or D1 to the first to third control units 52 to 54.

Herein, the first to third control units 52 to 54 store in advance, as with the integration control unit 51, the cooling program map Mcp as shown in FIG. 9. Therefore, according to the selected cooling program A1, B1, C1, or D1, the first to third control units 52 to 54 individually control the nozzles 6 and the fans 7 to provide the water amount and the air amount set for each cooling station 3 to 5 while giving feedback about the temperatures detected by the temperature sensors 34 to 36. This control is changed and executed for each stator 41 having been subjected to detection in the detecting station 14. Specifically, the selected cooling program A1-D1 is executed on the specified stator 41 subjected to detection in the detecting station 14 during the time from when the stator 41 is brought into the cover 9 through the entrance 10 thereof, cooled in each of the cooling stations 3 to 5, until the stator 41 is brought out of the cover 9 through the exit 12 thereof. In the present embodiment, the first to third control units 52 to 54 correspond to one example of the control device of the invention.

According to the cooling equipment 1 in the present embodiment described above, in the detecting station 14, each stator 41 is identified as the type A, B, C, or D by the distance sensors 31 to 33 and the integration control unit 51. In other words, the distance sensors 31 to 33 indirectly detect the size of each stator 41, and each stator 41 is identified as the type A, B, C, or D based on the detected size. One of the previously set cooling programs A1 to D1 is selected according to the determined one of the types A to D. The cooling program A1, B1, C1, or D1 is selected whenever the stators 41 are individually put in the cooling equipment 1. In each of the cooling stations 3 to 5, thereafter, fine particulate water, namely, dry mist, is produced and sprayed by each nozzle 6 to the relevant stator 41 and air is blown by each fan 7 toward the stator 41, thereby cooling this stator 41. At that time, dry mist evaporates around the stator 41, so that the stator 41 is cooled by the heat of evaporation of the dry mist.

Herein, in the detecting station 14, the type A-D of the stator 41 is identified by the first to third distance sensors 31 to 33 and the integration control unit 51. In each cooling station 3 to 5, the temperature of the stator 41 is detected by each temperature sensor 34 to 36. Based on the identified type A-D and the detected temperature, the amount of water to be supplied to each nozzle 6 and the amount of air to be supplied by each fan 7 in each cooling station 3 to 5 are respectively controlled to appropriate amounts by the first to third control units 52 to 54. According to the difference in type A-D of the stator 41 and the temperature state of the stator 41 in that state, an appropriate amount of dry mist required to cool the stator 41 is supplied. Therefore, irrespective of the difference in type A-D of the stator 41, it is possible to cool the stator 41 by completely evaporating the dry mist sprayed once onto the stator 41. Consequently, no dew concentrates on the surface of the stator 41 and hence no rust resulting from the dew concentration is generated.

In the present embodiment, in other words, the entire stator 41 after resin-molded is subjected to spraying of dry mist using air in each cooling station 3 to 5 so that the stator 41 is cooled by using the heat of evaporation of the dry mist. Furthermore, the present embodiment has a purpose to optimally cool, by use of the single cooling equipment 1, the stators 41 of multiple types A-D having different sizes without causing dew concentration on their surfaces. For this purpose, in each cooling station 3 to 5, a best cooling condition in each predetermined temperature range is selected. In each cooling station 3 to 5, furthermore, the temperature detected by each temperature sensor 34 to 36 is reflected in automatic adjustment of the amount of water (amount of dry mist) and the amount of air.

In the present embodiment, irrespective of the difference in type A-D, it is possible to appropriately cool the stator 41 by use of dry mist without causing dew concentration on the surface of the stator 41. Thus, there is no need to provide separate cooling equipment for individual types A-D of the stators 41. This can reduce a capital investment cost for stator cooling. Even when the stators 41 of different types A-D are put in random order into the single cooling equipment 1, each stator 41 can be appropriately cooled. Thus, the utilization rate of one cooling equipment 1 can be increased.

In the present embodiment, since the type A-D of the stator 41 is determined based on the vertical distance Dv and the horizontal distances Dh1 and Dh2 from the stator 41 detected by the distance sensors 31 to 33, the type determination is performed in a non-contact manner. More specifically, the size of the stator 41 is calculated from the detected vertical distance Dv and horizontal distances Dh1 and Dh2 and then the type A-D of the stator 41 is determined based on the calculated size. Accordingly, the stator 41 can be prevented from damage due to contact between the sensors and the stator 41.

In the present embodiment, at the time when the movement of the stator 41 is restricted by the stopper 8 in each cooling station 3 to 5, each temperature sensor 34 to 36 contacts each stator 41 and detects the temperature of each stator 41. Therefore, there is no need to provide a special mechanism to bring the temperature sensors 34 to 36 into contact with the stators 41. In this regard, the configuration of the cooling equipment 1 can be simplified.

Second Embodiment

A second embodiment embodying the stator cooling apparatus according to the invention will be explained in detail below referring to the accompanying drawings.

In the following explanation, similar or identical parts or components to those in the first embodiment are given the same reference signs as those in the first embodiment and their details are not repeated herein. The following explanation is focused on differences from the first embodiment.

Figure 10:
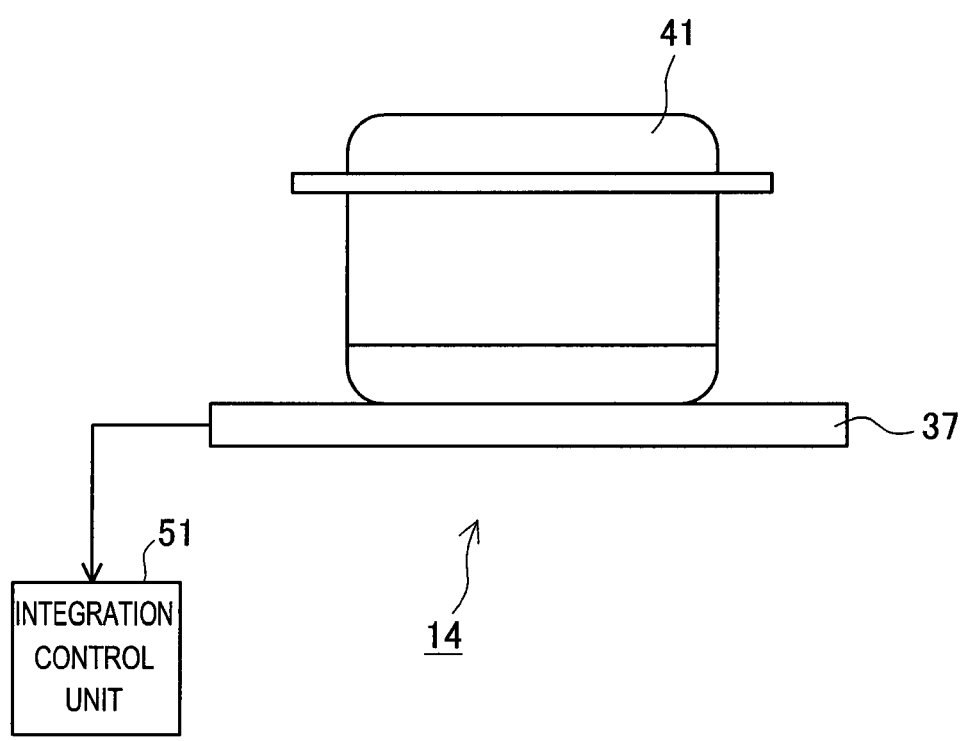
FIG. 10 is a schematic configuration view showing a detecting station in a second embodiment.

The present embodiment differs from the first embodiment in the configuration of the detecting station 14. FIG. 10 is a schematic configuration view of the detecting station 14. In the present embodiment, in the detecting station 14, a weight sensor 37 is provided to detect the weight of the stator 41 as a workpiece. The weight to be detected by this weight sensor 37 reflects the volume of the stator 41, the volume being different between types. The weight sensor 37 is connected to the integration control unit 51.

FIG. 11 is a table showing processing contents to be executed by the integration control unit 51. In FIG. 11, two circular marks, two rectangular marks, two triangular marks, and two X marks represent different weight values. The integration control unit 51 determines the type A-D of the stator 41 based on the detected weight value and selects one of the preset cooling programs A1 to D1 (see FIG. 9) according to the determined type A, B, C, or D. In the present embodiment, the weight sensor 37 and the integration control unit 51 constitute one example of the type identifying device of the present invention. Other configurations are identical to those in the first embodiment.

According to the cooling equipment of the present embodiment, therefore, in the detecting station 14, the type A-D of the stator 41 is identified by the weight sensor 37 and the integration control unit 51. Specifically, the weight of each stator 41 is detected by the weight sensor 37 and, based on the detected weight, the type A-D of the stator 41 is determined. According to the determined type A, B, C, or D, one of the preset cooling programs A1 to D1 is selected. The cooling program A1, B1, C1, or D1 is selected whenever the stators 41 are individually put in the cooling equipment 1. Thereafter, in each of the cooling stations 3 to 5, to cool the stator 41, the amount of water to be supplied to each nozzle 6 and the amount of air to be supplied by each fan 7 are controlled to respective appropriate amounts for each type A-D by the first to third control units 52 to 54 based on the temperatures detected by the temperature sensors 34 to 36. Thus, an appropriate amount of dry mist needed to cool is supplied to the stator 41 according to the difference in type A-D of the stator 41 and the temperature state of the stator 41 at that time. Consequently, irrespective of the difference in type A-D of the stator 41, the stator 41 can be appropriately cooled while the dry mist sprayed once onto the stator 41 evaporates completely.

In the present embodiment, the type A-D of the stator 41 is determined based on the detected weight of the stator 41 by the weight sensor 37, so that the type determination is performed by directly reflecting the heat capacity of the stator 41. This can enhance the precision of the type determination of the stator 41.

Third Embodiment

A third embodiment embodying a stator cooling apparatus according to the present invention will be described in detail later referring to the accompanying drawings.

Figure 12:
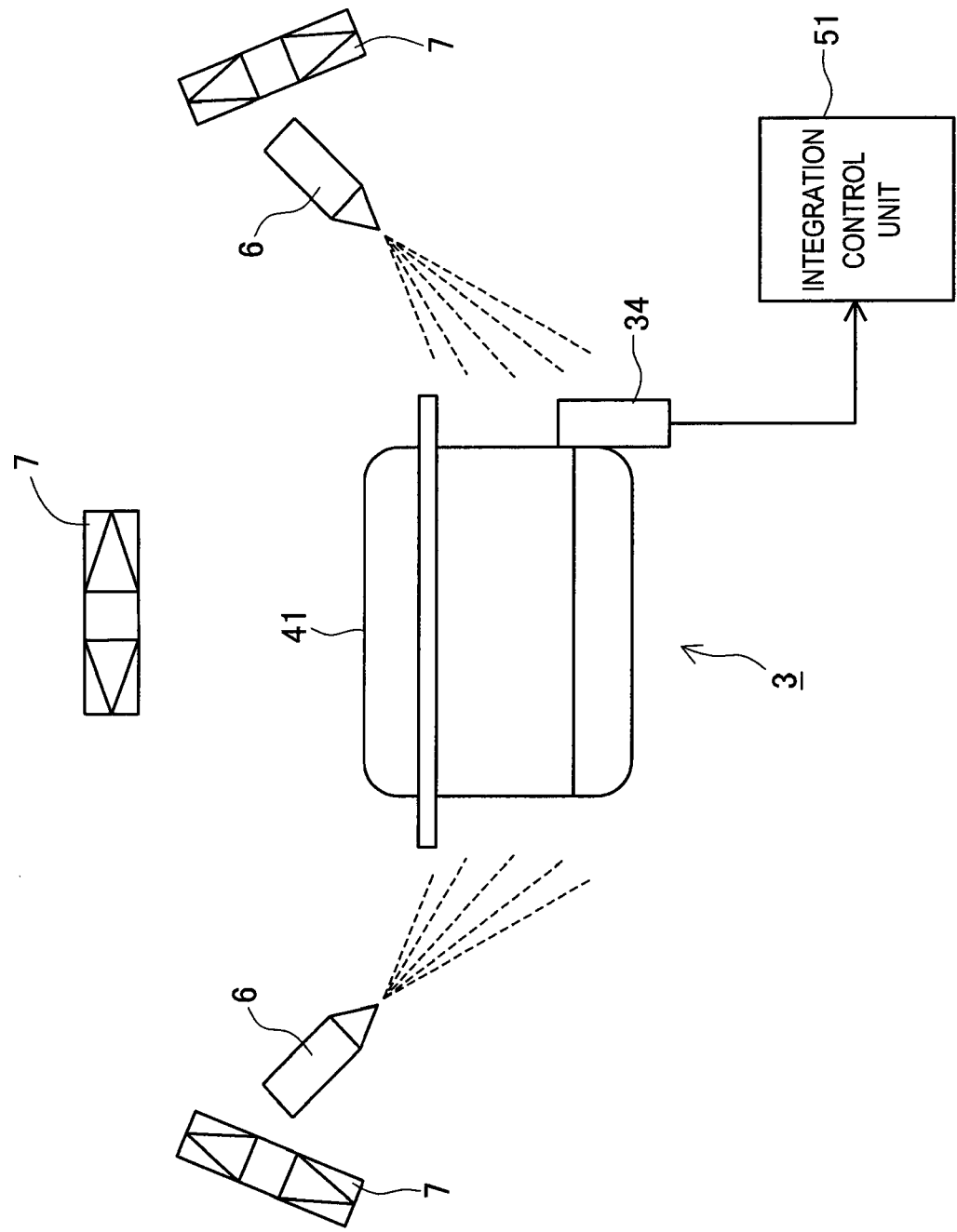
FIG. 12 is a schematic configuration view showing a first cooling station in a third embodiment.

This embodiment differs from the above embodiments in that the aforementioned detecting station 14 is omitted and instead the type of the stator 41 is identified in the first cooling station 3. FIG. 12 is a schematic configuration view of the first cooling station 3. In the present embodiment, the first temperature sensor 34 of the first cooling station 3 is electrically connected to the corresponding first control unit 52 and also electrically connected to the integration control unit 51. This integration control unit 51 calculates a lowering temperature of the stator 41 in a first cooling process based on the temperature detected by the first temperature sensor 34. This calculated lowering temperature reflects the volume different between types A to D of the stators 41. The integration control unit 51 determines the type A-D of the stator 41 based on the calculated lowering temperature.

FIG. 13 is a table showing the processing contents to be executed by the integration control unit 51. The marks in FIG. 13 represent the same meaning as the marks in FIG. 11. The integration control unit 51 determines the type A-D of the stator 41 based on the calculated lowering temperature, and selects one of the preset programs A1 to D1 (see FIG. 9) according to the determined type A, B, C, or D. In the present embodiment, the first temperature sensor 34 and the integration control unit 51 constitute one example of the type identifying device of the present invention. Other configurations are identical to those in the first embodiment.

According to the cooling equipment of the present embodiment, therefore, the stator 41 is cooled in the first cooling station 3 under the cooling condition common to all the types A-D of the stators 41. Specifically, each nozzle 6 and each fan 7 are controlled by the first control unit 52 to provide a predetermined amount of water and a predetermined amount of air to supply dry mist to the stator 41 for a predetermined time, thereby cooling the stator 41. At that time, the temperature of the stator 41 is detected by the first temperature sensor 34 before and after cooling. The integration control unit 51 calculates the lowering temperature of the stator 41 in the process of cooling in the first cooling station 3 based on the temperature detected before and after cooling. The integration control unit 51 determines the type A-D of the stator 41 based on the calculated lowering temperature different between types. Then, the integration control unit 51 selects one of the preset multiple cooling programs A1 to D1 according to the determined type A, B, C, or D. The cooling program A1, B1, C1, or D1 is selected whenever the stators 41 are individually put in the cooling equipment. In the present embodiment, the selected one of the cooling programs A1 to D1 is applied in the second cooling station 4 and the third cooling station 5. In the second and third cooling stations 4 and 5, for each of the types A-D of the stators 41, the amount of water to each nozzle 6 and the amount of air by each fan 7 are controlled to respective suitable amounts by the second and third control units 52 and 53 based on the temperatures detected by the second and third temperature sensors 35 and 36. Accordingly, a suitable amount of dry mist required for cooling is supplied according to the difference in type A-D of the stator 41 and the temperature state of the stator 41. Accordingly, irrespective of the difference in type A-D of the stator 41, the stator 41 can be appropriately cooled by completely evaporating the dry mist sprayed once onto the stator 41.

In the present embodiment, since the type A-D of the stator 41 is determined based on the lowering temperature of the stator 41 calculated based on the temperature detected by the first temperature sensor 34, differently from the first and second embodiments, any other sensor than the temperature sensors 34 to 36 is not necessary. From this point of view, the configuration of the cooling equipment can be simplified.

The present invention is not limited to each of the aforementioned embodiments and may be embodied in other specific forms without departing from the essential characteristics thereof.

For instance, although the cooling equipment includes three cooling stations 3 to 5 in each of the aforementioned embodiments, the number of cooling stations may be increased or decreased as needed.

INDUSTRIAL APPLICABILITY

The present invention is utilizable to a process of manufacturing a stator in a motor.

DESCRIPTION OF THE REFERENCE SIGNS

1 Cooling equipment
6 Nozzle (Spraying device)
7 Fan (Air-blowing device)
8 Stopper
31 First distance sensor (Type identifying device)
32 Second distance sensor (Type identifying device)
33 Third distance sensor (Type identifying device)
34 First temperature sensor (Temperature detecting device, Type identifying device)
35 Second temperature sensor (Temperature detecting device, Type identifying device)
36 Third temperature sensor (Temperature detecting device)

37 Weight sensor (Type identifying device)
41 Stator
51 Integration control unit (Type determining device, Type identifying device)
52 First control unit (Control device)
53 Second control unit (Control device)
54 Third control unit (Control device)
Dv Vertical distance
Dh1 Horizontal distance
Dh2 Horizontal distance
A-D Type

The invention claimed is:

1. A stator cooling apparatus to be used to cool a stator after molding, the apparatus including:
 a spraying device for spraying water in the form of fine particles to the stator;
 an air-blowing device for blowing air to the stator;
 a type identifying device for identifying a type of the stator;
 a temperature detecting device for detecting a temperature of the stator; and
 a control device for controlling an amount of water to be supplied to the spraying device and an amount of air to be supplied by the air-blowing device based on the identified type and the detected temperature;
 wherein the type identifying device includes a distance sensor for detecting a distance from the stator and a type determining device for determining the type of the stator based on the detected distance.

2. The stator cooling apparatus according to claim 1, wherein the type identifying device includes a weight sensor for detecting a weight of the stator and a type determining device for determining the type of the stator based on the detected weight.

3. The stator cooling apparatus according to claim 1, wherein the type identifying device includes a type determining device arranged to calculate a lowering temperature of the stator in a first cooling process based on the temperature detected by the temperature detecting device and determine the type of the stator based on the calculated lowering temperature.

4. The stator cooling apparatus according to claim 1, wherein the temperature detecting device is provided to be able to make contact with the stator due to a stopper for restricting movement of the stator.

5. The stator cooling apparatus according to claim 1, wherein the temperature detecting device is provided to be able to make contact with the stator due to a stopper for restricting movement of the stator.

6. The stator cooling apparatus according to claim 2, wherein the temperature detecting device is provided to be able to make contact with the stator due to a stopper for restricting movement of the stator.

7. The stator cooling apparatus according to claim 3, wherein the temperature detecting device is provided to be able to make contact with the stator due to a stopper for restricting movement of the stator.

* * * * *